April 19, 1955  R. E. RISLEY  2,706,495
SPACING DEVICE FOR CONCENTRIC TUBULAR UNITS
Filed Nov. 18, 1950  4 Sheets-Sheet 1
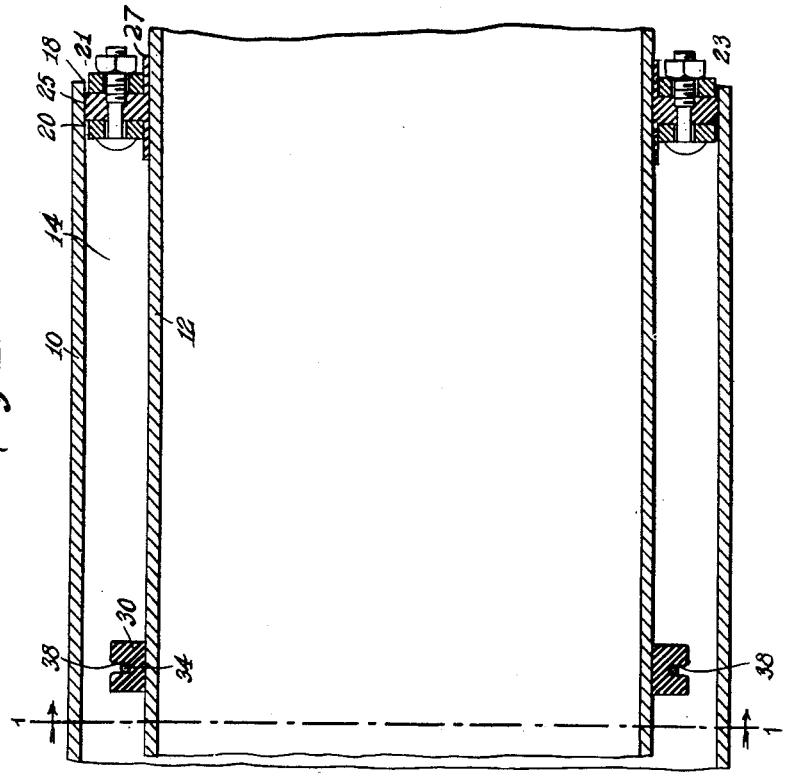
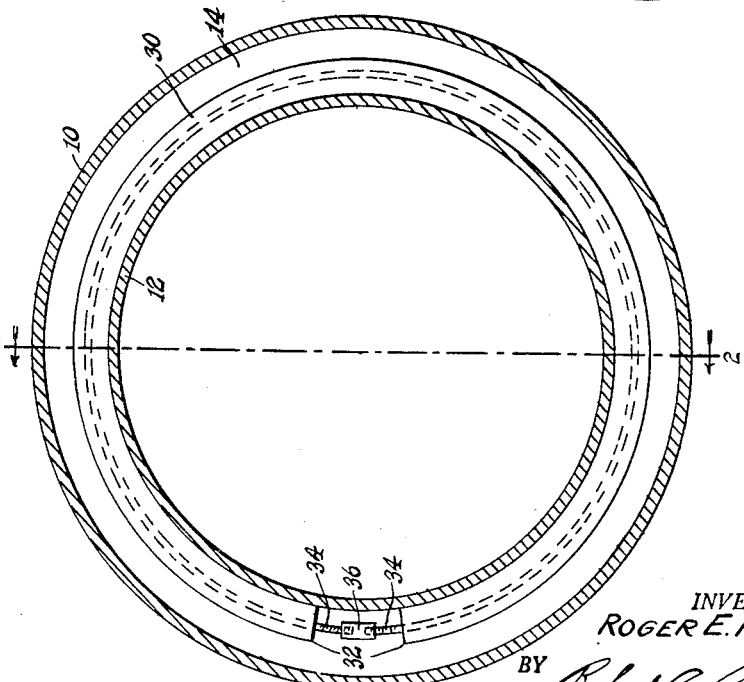
INVENTOR.
ROGER E. RISLEY
BY
ATTORNEY.

April 19, 1955     R. E. RISLEY     2,706,495
SPACING DEVICE FOR CONCENTRIC TUBULAR UNITS
Filed Nov. 18, 1950     4 Sheets-Sheet 2
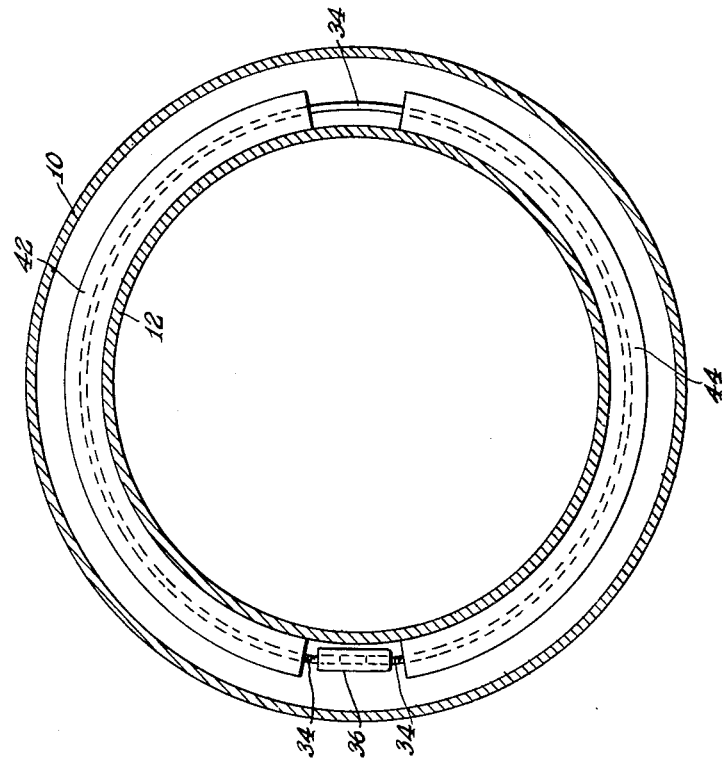
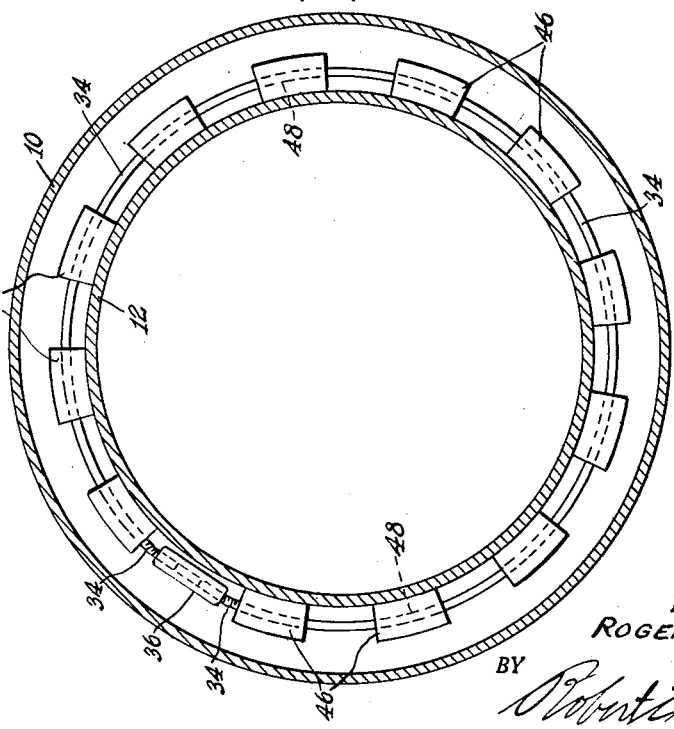
INVENTOR.
ROGER E. RISLEY
BY
ATTORNEY.

April 19, 1955  R. E. RISLEY  2,706,495
SPACING DEVICE FOR CONCENTRIC TUBULAR UNITS
Filed Nov. 18, 1950  4 Sheets-Sheet 3
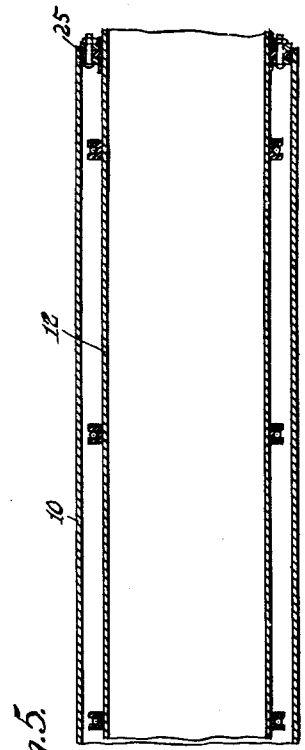
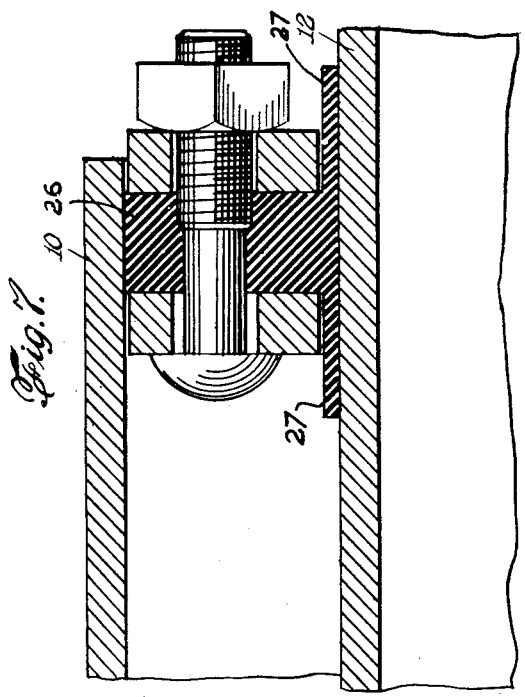
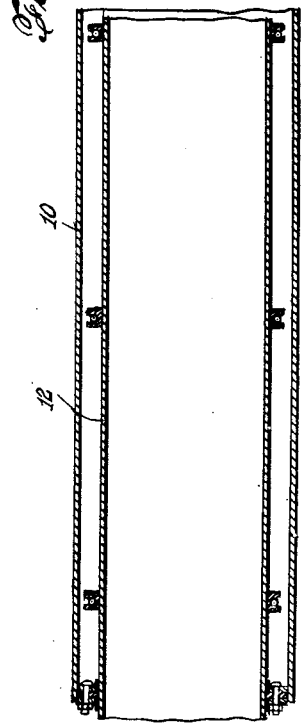
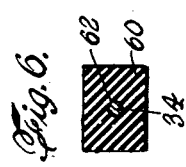
INVENTOR.
ROGER E. RISLEY
BY
ATTORNEY.

April 19, 1955   R. E. RISLEY   2,706,495
SPACING DEVICE FOR CONCENTRIC TUBULAR UNITS
Filed Nov. 18, 1950   4 Sheets-Sheet 4
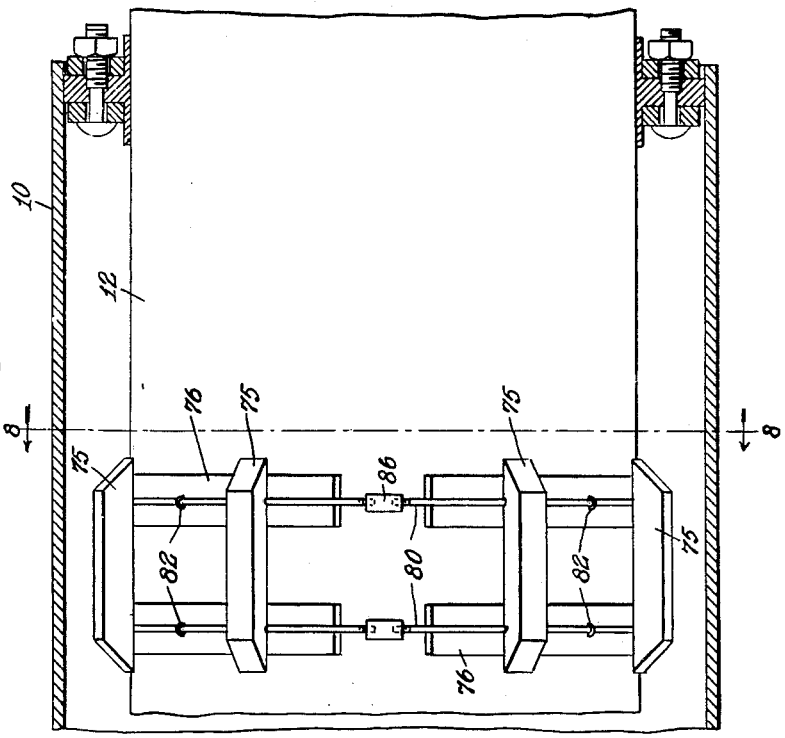
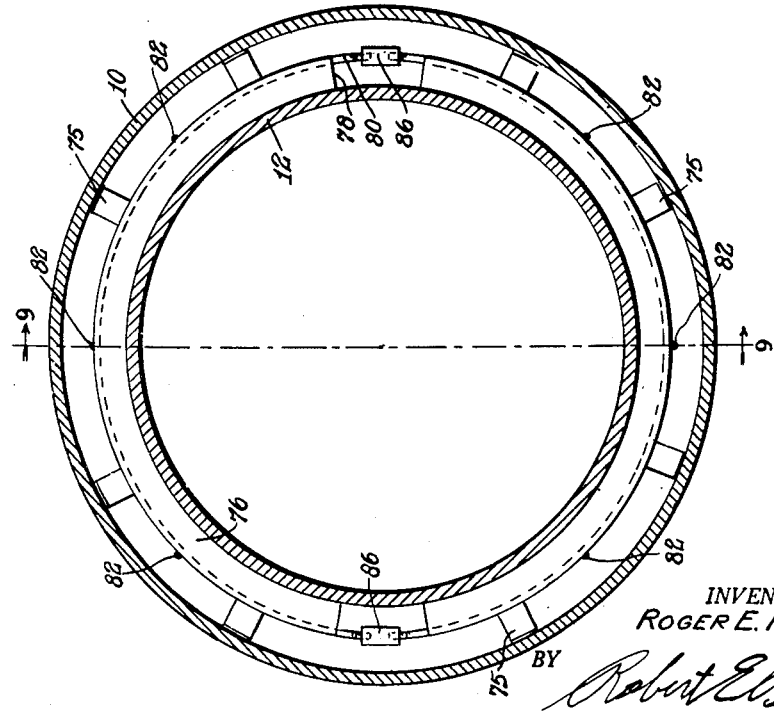
INVENTOR.
ROGER E. RISLEY
BY
*Robert E. Burns*
ATTORNEY.

United States Patent Office 2,706,495
Patented Apr. 19, 1955

2,706,495

SPACING DEVICE FOR CONCENTRIC TUBULAR UNITS

Roger E. Risley, Bradford, Pa., assignor to Dresser Industries, Inc., Dallas, Tex., a corporation of Pennsylvania Application November 18, 1950, Serial No. 196,503

9 Claims. (Cl. 138—65)

This invention relates to the insulation of concentric tubular lines and is more particularly concerned with insulating means for preventing the conduction of electrical currents between a pipe line and a pipe line casing.

In the construction and laying of pipe lines, it is frequently desirable to enclose at least a portion of the pipe line within a concentric protective casing. This is frequently done when the pipe line passes under a highway or the like built upon an elevation of earth or other fill. The casing is built into the elevation and the pipe line, which is of smaller diameter, is later passed through the casing which thus serves to protect the pipe line from the fill and also simplifies the problem of construction. Such casings are also commonly used in pipe line construction under railroad tracks, embankments of various types, across swamps, channels, streams and ditches. The casing not only protects the pipe line but also provides substantial support for the line. The annular space between the outer surface of the pipe line and the inner surface of the ends of the casing are customarily sealed by a bushing which centers the pipe and seals the space between the pipe and casing, thus preventing ingress of water, gases, small animals, and debris of various types. In such installations it is important to prevent contact between the pipe and the casing so that a conductive path for electric currents is not formed. It is well-known that metal pipe lines which pass through the ground are continuously subjected to the action of electric currents which emanate from a variety of sources such as streetcar or electrified railroad tracks, industrial power grounds, induced currents from parallel lines, chemical action of the soils through which the lines pass, and the like. If a pipe line is allowed to come in contact with the casing, it is recognized that galvanic action between the two metal bodies will generally occur and will result in serious electrolytic corrosion both of the casing and of the pipe line. Such electrolytic corrosion weakens the walls of the pipe and casing and in extreme cases causes the formation of holes. Since pipe lines are commonly used to carry liquids or gases under pressure, it is obvious that this type of electrolytic corrosion is a serious problem. Furthermore, it is of great practical importance to reduce to a minimum such electrolytic corrosion since repair or replacement of casings of this type or of the pipe line passing through them is expensive and time-consuming and necessitates costly interruptions in service.

Bushings for sealing the casing have been developed which are particularly effective for preventing the conduction of electrical currents between the casing and the pipe line. These bushings involve a compressible rubbery material which is compressed between two rings into sealing and fluid-tight engagement with the casing and the pipe line. The rings are dimensioned to fit within the annular space between the casing and the pipe line and are drawn together by suitable bolts to compress the rubbery material. While these bushings are satisfactory for preventing contact between the casing and the pipe line at the ends of the casing, it is common experience particularly in the case of relatively long stretches that contact between the pipe and the casing is established at one or more points between the ends of the casing and the insulating action of the bushings is thereby substantially nullified. Furthermore, such contact between the casing and the pipe may not be apparent upon installation but may occur after a period of use as the result of vibrations, expansion and contraction of the pipe line and the casing and similar causes. Such contact may therefore become apparent only after the electrolytic corrosion has occurred and the pipe line or casing has failed.

The problem of preventing contact between concentric tubular lines is also encountered, for example, in multiple casings for deep wells and in conduits carrying electrical cables.

It is an object of the present invention to provide means for preventing electrically conductive contact between concentric tubular elements.

It is another object of the invention to provide a device for preventing electrically conductive contact between a pipe and an elongated horizontal concentric casing.

It is another object of the invention to provide a pipe line and casing assembly which is resistant to electrolytic corrosion.

It is another object of the invention to provide a device of the character indicated which may be applied easily and rapidly in the field.

According to the invention, I provide a non-conductive spacing device which is adapted to be applied to the outer surface of the pipe or other inner tubular member and which is dimensioned to permit ready assembly, and expansion and contraction of the concentric tubular members in service, but is effective to prevent the inner member from coming into contact with the outer member. My spacing device includes a spacer unit which is formed from a resilient, non-conductive material, such as rubber, and comprises one or more elements adapted to be arranged as a ring around the tubular member, and non-resilient binding means for tightly applying the spacer to the surface of the inner tubular member. In the preferred embodiment of my invention the spacing device comprises a split spacer ring which is held against the surface of the inner tubular member by a wire, the ends of which are joined by a turn-buckle.

Advantageously my spacing devices are applied to the inner tubular member at spaced intervals in order that the spacing between the two members will be maintained throughout their length.

A feature of my spacing device is the provision of a groove in the spacer ring for receiving the wire or other securing means entirely below the outer peripheral surface of the spacer.

Other objects and features of my invention will be apparent from the following description and from the drawings, wherein Fig. 1 is a sectional view taken approximately along the line 1—1 of Fig. 2 showing my spacing device applied to the smaller of two concentric tubular members;

Fig. 2 is a sectional view taken approximately along the line 2—2 of Fig. 1;

Fig. 3 is a sectional view similar to Fig. 1 showing another embodiment of my spacing device;

Fig. 4 is a similar view showing another embodiment of my invention;

Fig. 5 is a sectional view of a pipe positioned in a concentric casing showing the use of a plurality of spacing devices according to the invention;

Fig. 6 is a sectional view of a modified form of spacing device;

Fig. 7 is an enlarged view of the bushing arrangement shown in Figs. 2 and 5;

Fig. 8 is a sectional view taken approximately along the line 8—8 of Fig. 9 showing a modified form of my spacing device; and Fig. 9 is a sectional view taken approximately along the line 9—9 of Fig. 8.

Referring to the drawings, and particularly to Figs. 1 and 2, the numeral 10 designates a tubular casing in which is positioned a pipe line 12 of smaller diameter than the casing, whereby an annular space 14 is defined by the outer surface of pipe line 12 and the inner surface of casing 10. The casing 10 illustrated may be of castiron, steel or other construction commonly employed in carrying pipe lines under highways, railroad tracks, through swamps and similar terrain. The pipe line 12 is similarly of known construction formed from sections of steel, castiron or other metal, the pipe sections being joined by welding or by couplings of various types (not shown).

At the entrance 18 to casing 10, as shown in Fig. 2, the annular space 14 between casing 10 and pipe 12 is sealed by a "bushing" which comprises two coaxial parallel follower rings 20 and 21 which are drawn together by bolts 23 passing through suitable aligned apertures in the follower rings to compress a gasket 25. The gasket 25, upon axial compression between followers 20 and 21, expands radially into sealing engagement with the outer surface of pipe 12 and the inner surface of casing 10 to provide a flexible but fluid-tight seal effectively closing the annular space 14 against ingress of water, small animals, debris and the like. In the embodiment shown in the drawing, the gasket 25 is substantially T-shaped in cross-section and comprises an upstanding body portion 26 and flange portions 27 extending outwardly from each side of one end of body portion 26. The gasket 25 is formed from rubber or rubber composition, this term being used generically to include natural and synthetic rubbers and elastomeric compounds, or compositions having like properties and characteristics. The material is non-conductive and is relatively firm and solid but sufficiently resilient and elastic to flow under pressure to conform to the surfaces between which it is confined. It will be observed that the follower rings 20 and 21 bear against the flange portions 27 and metal-to-metal contact between the rings and the pipe is prevented and the pipe is thus effectively insulated from the casing. It will be obvious that the same result would be obtained by forming the flange portions 27 on the outer end of body portion 26 so that the flange would be against the inner surface of the casing. While a gasket 25 having flange portions 27 is preferred, it will also be apparent that the flange portions could be omitted and by forming the followers 20 and 21 with a radial width substantially less than the width of annular space 14, a fluid-tight insulating bridge between the pipe and the casing could be obtained.

As shown in Fig. 5, a bushing of the type described is positioned at each end of casing 10. As pointed out above, the bushings effectively center the pipe 12 in casing 10 and prevent electrically conductive contact between the pipe and the casing at the ends thereof. Such bushings are in themselves, however, frequently not adequate, particularly in casings of substantial length, to insure against electrically conductive contact between the pipe 12 and the casing 10 along the entire length of the casing. In accordance with the invention I provide a simple but highly effective means for insuring adequate spacing between the pipe 12 and the casing 10 under all normal conditions of service and yet permitting relative expansion and contraction by the pipe line and the casing and permitting adequate deflection of these two concentric tubular members.

Referring to Figs. 1 and 2, one illustrative embodiment of the spacing device according to the invention, comprises an annular assembly including an open spacer ring 30 formed from a resilient non-conducting material of the type from which gasket 25 is made, and binding means for drawing the ends 32 of spacer ring 30 together and drawing ring 30 into close engagement with the outer surface of pipe 12. In the embodiment shown, the binding means comprises a wire 34 having threaded ends engageable in a turn-buckle 36.

As shown in Fig. 2, spacer ring 30 has a substantially rectangular cross-section with slightly rounded outer edges and is formed with an annular groove 38 in which is seated the wire 34. The groove 38 is sufficiently deep that the outer surface of wire 34 is substantially below the outer surface of ring 30.

It will be understood, of course, that spacer ring 30 may be formed in sizes to be used with casings and pipe lines of various diameters. Generally speaking the radial width of spacer ring 30 should be substantially less than the radial width of the annular space 14, and for best practical results the radial width of ring 30 should be about one-half to three-quarters the radial width of the space 14. The size of the spacing 40 between the ends 32 of ring 30 may, of course, vary and it is not necessary that contact between the turn-buckle 36 and the pipe 12 be prevented since such contact will not, of course, establish an electrically conductive path between pipe 12 and casing 10. Since spacer ring occupies only a portion of the radial width of annular space 14, insertion of a pipe provided with my spacing devices into a casing is easily accomplished and a limited amount of flexing and movement of the pipe within the casing is permitted, without danger of contact between the two concentric tubular members.

Furthermore, my spacer ring may take several forms. It is not necessary that the body of the ring 30 be continuous and it may advantageously be divided into two or more discontinuous sections. As shown in Fig. 4, the spacer ring may be divided into two spaced sections 42 and 44 or, as shown in Fig. 3, the spacer ring may be formed from a plurality of interconnected ring segments. Referring to Fig. 3, the spacer ring is formed by segments 46 which are provided with grooves 48 extending inwardly from their outer peripheral surface and in which is seated the wire 34 which serves both to press the segments 46 into contact with the surface of pipe 12 and to hold the segments 46 in peripherally-spaced relationship. While in Fig. 3 I have shown a ring composed of twelve segments, it will be apparent that a greater or lesser number of segments may be suitably provided. Preferably, however, I form the spacer ring 30 from a single continuous spacer element, as shown in Fig. 1.

Instead of forming the spacer ring with a recess to receive the binding wire, I may, as shown in Fig. 6, provide a spacer ring 60, similar to ring 30 but having a circumferential bore 62 through which the binding wire 34 is passed. The bore 62 is sufficiently below the circumferential surface of ring 60 to prevent any change of exposure of the wire 34. The ring 60 may be formed separately and the binding wire passed through the bore 62 to assemble the spacing device or the binding wire and the ring 60 may be formed integrally during the molding of the ring by well-known molding procedures.

To apply the spacer ring 30 it is merely necessary to slip it over the end of the pipe and then to tighten the wire 34 by means of turn-buckle 36 until the ring 30 is in tight frictional engagement with pipe 12. The number of spacer rings which should be applied will, of course, depend upon the length of the casing and the surface conditions to which the casing and the pipe ring will be subjected. Generally speaking, however, I have found it desirable to space the rings at axial intervals of about 10–30 feet. After the requisite number of spacer rings have been applied to the pipe, the ends of casing 10 are sealed by casing bushings, i. e., the follower rings 20 and 21 and gasket 25 are slipped over the pipe 12 and the bolts 23 then tightened to compress the gasket 25 into sealing engagement with pipe 12 and casing 10. Conveniently the gasket 25 and the follower rings 20 and 21 may be split so that they may be directly applied to the pipe 12 without reference to the location of the end of the pipe. Similarly the spacer rings 30 may be applied around a pipe by opening the turn-buckle 36.

While I have described the application of my spacer rings in terms of a plurality of individual rings spaced at predetermined intervals longitudinally of the inner pipe, I may also advantageously form my spacing device as an integral group of two or more spacer rings, the individual rings being joined by suitable connectors. This arrangement is desirable in certain types of installations, particularly when it is desired to reduce to a minimum the relative deflection between the inner and outer tubular members. Referring particularly to Figs. 8 and 9, there is shown a spacing device in accordance with my invention comprising two spacer rings connected by metal runners 75 to form an integral unit. Each spacer ring, as shown, comprises two ring segments 76 formed with a shallow peripheral groove 78 in which is seated a binding wire segment 80. The depth of the groove 78 is such that the outer surface of the binding wire 80 lies substantially flush with the outer surface of the segment 76 with which it is associated and the threaded ends of the binding wire segments 80 extend somewhat beyond the ends of the ring segments 76. The runners 75 extend across the two spacer rings and are secured, as by welding, to the substantially parallel binding wire segments 80. In order to prevent displacement of the binding wire from the ring segments during handling of the spacer assembly, staples 82 are advantageously used to hold the binding wires in place, as shown in Fig. 9. When the spacer assembly is mounted upon the inner pipe 12 it is brought into firm frictional engagement therewith by means of turnbuckles 86 which receive the ends of the binding wire segments 80. As will be seen by reference to Fig. 8 the metal runners 75 are spaced at convenient intervals along the periphery of the ring segments 76 and extend between the outer surface of the ring segments and the inner surface of the outer pipe 10, thus preventing any substantial change in the relative spacing of pipes 10 and 12 and thereby tending to prevent independent deflection of these pipes. It will be observed, however, that an effective electrically insulating barrier is still provided between the two opposed surfaces of the two pipes. Although the runners 75 are made of metal, the rubber ring segments 76 prevent electrically conductive contact between the two pipes. The spacer assemblies are positioned in spaced relationship longitudinally of the pipes in the manner shown in Fig. 5.

While I have referred to the use of a turn-buckle 36 for connecting the ends of wire 34, I may also employ other adjustable connecting means, although from the standpoint of ease of application, the turn-buckle is preferred.

Furthermore, although I have described my invention with reference to an underground pipe line and a protective casing, my spacing means are also, as previously mentioned, particularly suited for preventing contact between the members of other constructions involving concentric tubular elements, for example, in connection with the multiple casings of deep wells and in connection with an electrical cable or conductor carried in a conduit.

While I have shown and described my invention with reference to certain preferred embodiments thereof, it will be apparent that various changes may be made without departing from the scope of the invention as defined in the appended claims and it is intended, therefore, that all matter contained in the foregoing description and in the drawings shall be interpreted as illustrative and not in a limiting sense.

What I claim and desire to secure by Letters Patent is:

1. In a tubular assembly including an outer tubular member and a concentric spaced inner tubular member, in combination, annular spacing means positioned on the outer surface of the inner tubular member, said spacing means comprising a plurality of elongated, flexible, resilient, insulating segments having circumferentially spaced-apart ends, and having a radial groove extending inwardly from the outer peripheral surface thereof, binding means seated in said groove, said binding means being adapted to press said segment into engagement with said inner tubular member, and a plurality of circumferentially spaced-apart axially extending rigid members secured to said binding means.

2. In a tubular assembly including an outer tubular member and a concentric spaced inner tubular member, in combination, annular spacing means positioned on the outer surface of the inner tubular member, said spacing means comprising at least one elongated, flexible, resilient insulating split ring having circumferentially spaced-apart ends and having a radial groove extending inwardly from the outer peripheral surface thereof, binding means seated in said groove, said binding means being adapted to press said ring into engagement with said inner tubular member, and a plurality of circumferentially spaced-apart axially extending rigid members secured to said binding means.

3. In a tubular assembly including an outer tubular member and a concentric spaced inner tubular member, in combination, annular spacing means positioned on the outer surface of the inner tubular member, said spacing means comprising a plurality of interconnected open rings disposed in axially parallel relationship, each of said rings comprising at least one elongated, flexible, resilient, insulating segment having circumferentially spaced-apart ends, and having a radial thickness substantially less than the radial thickness of the space between said outer tubular member and said concentric inner tubular member, binding means engageable with said rings and adapted to press said rings into engagement with said inner tubular member, and a plurality of circumferentially spaced-apart axially extending rigid members secured to said binding means, and interconnecting said plurality of open rings.

4. In a tubular assembly, including an outer tubular member and a concentric spaced inner tubular member, in combination, annular spacing means positioned on the outer surface of the inner tubular member, said spacing means comprising a plurality of axially spaced apart rings, each ring comprising at least one elongated, flexible, resilient insulating segment having circumferentially spaced-apart ends, binding means engageable with the outer periphery of said segment and adapted to press the segment into engagement with said inner tubular member, and a plurality of circumferentially spaced-apart axially-extending rigid members secured to said binding means and interconnecting said rings.

5. In a tubular assembly, including an outer tubular member and a concentric spaced inner tubular member, in combination, annular spacing means positioned on the outer surface of the inner tubular member, said spacing means comprising a plurality of elongated, flexible, resilient insulating rings formed from a plurality of segments each having circumferentially spaced-apart ends, binding means engageable with the outer periphery of said ring and adapted to press the ring into engagement with said inner tubular member, and a plurality of circumferentialy spaced-apart axially-etxending rigid members secured to said binding means and interconnecting said rings.

6. In a pipe line including a casing concentric with but of greater diameter than said line, in combination, spacing means positioned on the outer surface of said pipe line comprising a plurality of elongated, flexible, resilient insulating open rings having circumferentially spaced-apart ends, binding means engageable with said rings and adapted to press said rings into engagement with said pipe line, and a plurality of circumferentially spaced-apart axially-extending rigid members secured to said binding means and interconnecting said plurality of rings.

7. In a pipe line, including a casing surrounding a portion of said pipe line, said casing being concentric with and of greater radial dimension than said pipe line portion to define an annular space therebetween with the radial width of said annular space being substantially less than the radius of said pipe line portion, in combination, insulating spacing and bushing means in said annular space adjacent the ends of said casing for spacing said casing from said pipe line portion and for sealingly closing the ends of said annular space and preventing electrically conductive contact between said casing and said pipe line portion, said insulating spacing and bushing means comprising a pair of annular apertured ring members having a radial dimension less than the radial dimension of said space, and a resilient rubbery annular member disposed between said ring members and having apertures aligned with the apertures in said ring members, said annular member having axial extensions from each side of its radially inner circumferential surface overlying said pipe line portion, said extensions having an axial length substantially greater than the axial dimension of each of said ring members, and clamping means for urging said ring members axially together to compress said annular member into sealing engagement with the inner surface of said casing and with the outer surface of said pipe line portion.

8. In a pipe line, including a casing surrounding a portion of said pipe line, said casing being concentric with and of greater radial dimension than said pipe line portion to define an annular space therebetween with the radial width of said annular space being substantially less than the radius of said pipe line portion, in combination, insulating spacing and bushing means in said annular space adjacent the ends of said casing for spacing said casing from said pipe line portion and for sealingly closing the ends of said annular space and preventing electrically conductive contact between said casing and said pipe line portion, said insulating spacing and bushing means comprising a pair of annular apertured ring members having a radial dimension less than the radial dimension of said space, and a resilient rubbery annular member disposed between said ring members and having apertures aligned with the apertures in said ring members, said annular member having axial extensions from each side of its radially inner circumferential surface overlying said pipe line portion, said extensions having an axial length substantially greater than the axial dimension of each of said ring members, and clamping means for urging said ring members axially together to compress said annular member into sealing engagement with the inner surface of said casing and with the outer surface of said pipe line portion, and at least one spacing means carried by said pipe line portion in said annular space between the insulating spacing and bushing means at each end of the casing.

9. In a pipe line, including a casing surrounding a portion of said pipe line, said casing being concentric with and of greater radial dimension than said pipe line portion to define an annular space therebetween with the radial width of said annular space being substantially less than the radius of said pipe line portion, in combination, insulating spacing and bushing means in said annular space adjacent the ends of said casing for spacing said casing from said pipe line portion and for sealingly closing the ends of said annular space and preventing electrically conductive contact between said casing and said pipe line portion, said insulating spacing and bushing means comprising a pair of annular apertured ring members having a radial dimension less than the radial dimension of said space, and a resilient rubbery annular member disposed between said ring members and having apertures aligned with the apertures in said ring members, said annular member having axial extensions from each side of its radially inner circumferential surface overlying said pipe line portion, said extensions having an axial length substantially greater than the axial dimension of each of said ring members, and clamping means for urging said ring members axially together to compress said annular member into sealing engagement with the inner surface of said casing and with the outer surface of said pipe line portion, and at least one intermediate spacing means carried by said pipe line portion in said annular space between the insulating spacing and bushing means at each end of the casing, said intermediate spacing means including a flexible resilient insulating ring engaged with said pipe line portion for preventing electrically conductive contact between said casing and said pipe line portion.

References Cited in the file of this patent

UNITED STATES PATENTS

| | | |
|---|---|---|
| 452,565 | Curry | May 19, 1891 |
| 1,773,398 | Lavelle | Aug. 19, 1930 |
| 1,903,467 | MacClatchie | Apr. 11, 1933 |
| 1,991,455 | Gottwald | Feb. 19, 1935 |
| 2,258,135 | Curtis | Oct. 7, 1944 |
| 2,543,954 | Barber | Mar. 6, 1951 |
| 2,551,867 | Bond | May 8, 1951 |

FOREIGN PATENTS

| | | |
|---|---|---|
| 332,914 | Great Britain | July 14, 1930 |
| 538,119 | Great Britain | July 22, 1941 |